US012731581B2

(12) United States Patent
Chang et al.

(10) Patent No.: US 12,731,581 B2
(45) Date of Patent: Sep. 8, 2026

(54) TRANSFORMER-BASED VOICE RECOGNITION TECHNOLOGY USING IMPROVED VOICE AS CONDITIONING FEATURE

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Da-Hee Yang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 347 days.

(21) Appl. No.: 17/884,086

(22) Filed: Aug. 9, 2022

(65) Prior Publication Data

US 2023/0386457 A1 Nov. 30, 2023

(30) Foreign Application Priority Data

May 26, 2022 (KR) ........................ 10-2022-0064615

(51) Int. Cl.
*G10L 15/20* (2006.01)
*G10L 15/02* (2006.01)
(Continued)

(52) U.S. Cl.
CPC .............. *G10L 15/20* (2013.01); *G10L 15/02* (2013.01); *G10L 15/16* (2013.01); *G10L 15/22* (2013.01); *G10L 21/02* (2013.01); *G10L 25/84* (2013.01)

(58) Field of Classification Search
CPC ......... G10L 15/20; G10L 15/02; G10L 15/16; G10L 15/22; G10L 25/84; G10L 15/063; G10L 21/02
See application file for complete search history.

(56) References Cited

U.S. PATENT DOCUMENTS

2020/0211566 A1* 7/2020 Kang ...................... G10L 17/20
2023/0298591 A1* 9/2023 Ding ...................... G10L 25/78 704/246
2023/0298609 A1* 9/2023 O'Malley .............. G10L 15/16 704/226

FOREIGN PATENT DOCUMENTS

CN 114255744 A * 3/2022 ......... G06F 18/2415
JP 2010-266488 A 11/2010
WO 2022/079129 A1 4/2022

OTHER PUBLICATIONS

O'Malley, T., Narayanan, A., Wang, Q., Park, A., Walker, J., & Howard, N. (Dec. 2021). A conformer-based asr frontend for joint acoustic echo cancellation, speech enhancement and speech separation. In 2021 IEEE Automatic Speech Recognition and Understanding Workshop (ASRU) (pp. 304-311). IEEE. (Year: 2021).*

(Continued)

*Primary Examiner* — Hai Phan
*Assistant Examiner* — Nathan Tengbumroong
(74) *Attorney, Agent, or Firm* — Sughrue Mion, PLLC

(57) ABSTRACT

Disclosed is a transformer-based voice recognition technology using an improved voice as a conditioning feature. A voice recognition method performed by a voice recognition system may include inputting, to a voice recognition model, clean voice data estimated by a voice improvement model and voice data including noise and performing voice recognition based on the estimated clean voice data and the voice data including the noise by using the voice recognition model. The voice recognition model may be trained to perform the voice recognition robust against noise through a combination of a voice feature of the voice data including the noise and a voice feature of the estimated clean voice data by using the estimated clean voice data as a conditioning feature.

6 Claims, 4 Drawing Sheets

(51) Int. Cl.

| | |
|---|---|
| ***G10L 15/16*** | (2006.01) |
| ***G10L 15/22*** | (2006.01) |
| ***G10L 21/02*** | (2013.01) |
| ***G10L 25/84*** | (2013.01) |

(56) References Cited

OTHER PUBLICATIONS

Zeghidour, Neil, et al. "Soundstream: An end-to-end neural audio codec." IEEE/ACM Transactions on Audio, Speech, and Language Processing 30 (2021): 495-507. (Year: 2021).*

Felix Weninger et al., "Speech enhancement with LSTM recurrent neural networks and its application to noise-robust ASR," in Proc. of the Int. Conf. on Latent Variable Analysis and Signal Separation, Jun. 2015, pp. 91-99.

Zhong-Qiu Wang, et al "A joint training framework for robust automatic speech recognition," IEEE/ACM Transactions on Audio, Speech, and Language Processing, 2016, pp. 796-806, vol. 24, No. 4.

Ethan Perez, et al. "Film: Visual reasoning with a general conditioning layer," in Proc. AAAI Conference on Artificial Intelligence, 2018., vol. 32, No. 1.

Communication issued Dec. 18, 2024 in Korean Application No. 10-2022-0064615.

* cited by examiner

TRANSFORMER-BASED VOICE RECOGNITION TECHNOLOGY USING IMPROVED VOICE AS CONDITIONING FEATURE

CROSS-REFERENCES TO RELATED APPLICATIONS

This application is based on and claims priority under 35 U.S.C. 119 to Korean Patent Application No. 10-2022-0064615, filed on May 26, 2022 in the Korean intellectual property office, the disclosures of which are herein incorporated by reference in their entireties.

TECHNICAL FIELD

The following description relates to a voice recognition technology.

BACKGROUND OF THE DISCLOSURE

Voice recognition is a technology for outputting corresponding text from an input voice. Recently, the development of an end-to-end neural network has led significant advances in a voice recognition system. In order to improve performance of the voice recognition system, various models from a recurrent neural network model using an attention mechanism to a transformer have been applied, and have showed good performance in the voice recognition system. In particular, the transformer has learnt a relation between sequences by using multi-head self-attention that is a major component, has enabled parallel processing of computation, and has increased efficiency. For this reason, the transformer has achieved significant results in a sequence-to-sequence, a neural transducer, and the voice recognition structure of connectionist temporal classification (CTC).

However, an end-to-end voice recognition model is very vulnerable to an environment in which noise is present although it has been significantly developed. The reason for this is that an attention mechanism used to derive good performance in end-to-end voice recognition is easily subjected to interference attributable to a variation, such as noise. Input voices used in the voice recognition system are easily subjected to interference from various types of surrounding background noise in an actual environment. Accordingly, there is a need for a scheme in which end-to-end voice recognition is robust against even a variation, such as noise.

For the above reason, one of major issues of the voice recognition system is how robust the system is against noise in a surrounding environment. Using a voice improvement system for a voice recognition system that is robust against noise is a widely used method. One of major methods is to use the voice improvement system as pre-processing at the front end of the voice recognition system. The voice improvement system refers to a technology for estimating a clean voice by removing, from a noise component, a voice signal that is input to a microphone and that includes noise. Deep learning-based voice improvement systems recently gain significant attraction. Methods of using a clean voice estimated by the voice improvement system for a performance test on the voice recognition system or retraining the voice recognition system by using an estimated clean voice have improved performance of voice recognition from a voice including noise. However, a clean voice estimated by the voice improvement system does not always show good results in the voice recognition system. The voice improvement system tends to generate an over-smoothed voice for good voice quality. Artifacts occurring due to the over-smoothed voice have a bad influence on performance of the voice recognition system.

PRIOR ART DOCUMENT

Non-Patent Document

Non-patent document 1: F. Weninger, H. Erdogan, S. Watanabe, E. Vincent, J. Le Roux, J. R. Hershey, and B. Schuller, "Speech enhancement with LSTM recurrent neural networks and its application to noise-robust ASR," in Proc. of the Int. Conf. on Latent Variable Analysis and Signal Separation, 2015, pp. 91-99.

Non-patent document 2: Z.-Q. Wang and D. Wang, "A joint training framework for robust automatic speech recognition," IEEE/ACM Transactions on Audio, Speech, and Language Processing, vol. 24, no. 4, pp. 796-806, 2016.

Non-patent document 3: E. Perez, F. Strub, H. De Vries, V. Dumoulin, and A. Courville, "Film: Visual reasoning with a general conditioning layer," in Proc. AAAI Conference on Artificial Intelligence, vol. 32, no. 1, 2018.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments may provide a method and system for reducing an influence from noise when using a voice improvement model in a voice recognition model by using, as a conditioning feature, a clean voice estimated by the voice improvement model without directly using the clean voice as an input feature of the voice recognition model.

Embodiments may provide a voice recognition method and system that are robust against noise by adding a FiLM layer to an end-to-end voice recognition model encoder structure of a transformer structure composed of self-attention.

In various embodiments, a voice recognition method performed by a voice recognition system may include inputting, to a voice recognition model, clean voice data estimated by a voice improvement model and voice data including noise and performing voice recognition based on the estimated clean voice data and the voice data including the noise by using the voice recognition model. The voice recognition model may be trained to perform the voice recognition robust against noise through a combination of a voice feature of the voice data including the noise and a voice feature of the estimated clean voice data by using the estimated clean voice data as a conditioning feature.

The voice recognition model may be a model in which a feature-wise layer modulation (FiLM) layer is added to an encoder of an end-to-end voice recognition model of a transformer structure including a self-attention layer.

The end-to-end voice recognition model of the transformer structure may include a CTC/Attention structure in which CTC and an AED model have been combined.

The voice recognition model may be configured to combine the voice feature of the estimated clean voice data and the voice feature of the voice data including the noise and to model acoustic information.

The voice recognition model may be configured to output a scale value and a bias value through a modulator configured in the voice recognition model with respect to the voice feature of the estimated clean voice data and to combine the output scale value and bias value with the voice feature of the voice data including the noise in a FiLM layer configured in an encoder of the voice recognition model.

The transformer structure is a transformer structure in which the FiLM layer has been added to a stage ahead of a multi-head self-attention layer.

The voice recognition model may include a modulator and a plurality of transformer layers, and the transformer layer may include FiLM, multi-head self-attention, and a feed-forward module.

The encoder may include a convolutional layer, layer normalization, multi-head self-attention, a feed-forward layer, and a residual connection.

In various embodiments, a voice recognition system may include a data input unit configured to input, to a voice recognition model, clean voice data estimated by a voice improvement model and voice data including noise and a voice recognition execution unit configured to perform voice recognition based on the estimated clean voice data and the voice data including the noise by using the voice recognition model. The voice recognition model may be trained to perform the voice recognition robust against noise through a combination of a voice feature of the voice data including the noise and a voice feature of the estimated clean voice data by using the estimated clean voice data as a conditioning feature.

A method that is widely used to implement voice recognition that is robust against noise is to use a clean voice estimated by a voice improvement system, and shows better voice recognition performance than that using a voice including noise. However, a voice improvement model sometimes generates noise, which causes to degrade voice recognition performance.

According to an embodiment, a clean voice estimated by the voice improvement model is not directly used as an input feature of the voice recognition model, but is used as a conditioning feature through the FiLM layer. Accordingly, an influence from noise can be reduced by adaptively selecting required information from an estimated clean voice in a process of training the voice recognition model in the FiLM layer that is present in each transformer layer.

Furthermore, according to an embodiment, an attention mechanism structure that is vulnerable to noise may be made robust against noise. In other words, a direct bad influence from noise is prevented and a transformer model structure is implemented to be more robust against noise by using a clean voice as an assistant feature for the training of the voice recognition model.

Furthermore, according to an embodiment, the recognizer can be trained by using noise not having noise because the FiLM layer receives a voice including noise as an input feature. An estimated clean voice can be used as a conditioning feature of an input feature through a method of adding the FiLM layer to the existing transformer structure. Results that are more robust against noise than those in the existing model although the number of parameters is slightly increased.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

In an embodiment, there is described a voice recognition method and system for reducing an influence from noise when using a voice improvement model in a voice recognition model. A clean voice estimated by the voice improvement model is used as a conditioning feature of learning data without directly using the clean voice as an input voice of the voice recognition model. To this end, an attention structure is made robust against noise by adding a feature-wise layer modulation (FiLM) layer to the encoder structure of an end-to-end voice recognition model of a transformer structure including a self-attention layer. For a description of the FiLM layer, reference is made to Non-patent document 4 (E. Perez, F. Strub, H. De Vries, V. Dumoulin, and A. Courville, "Film: Visual reasoning with a general conditioning layer," in Proc. AAAI Conference on Artificial Intelligence, vol. 32, no. 1, 2018).

Figure 1:
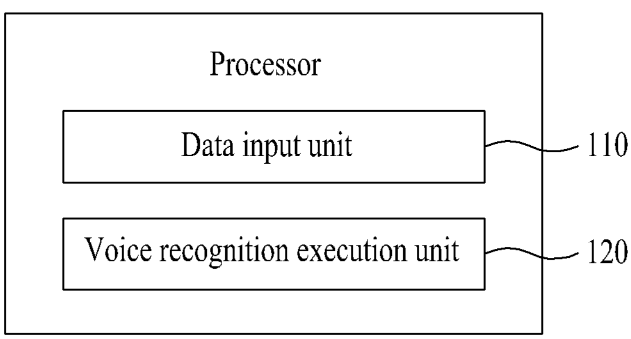
FIG. 1 is a block diagram for describing a construction of a voice recognition system in an embodiment.
Figure 2:
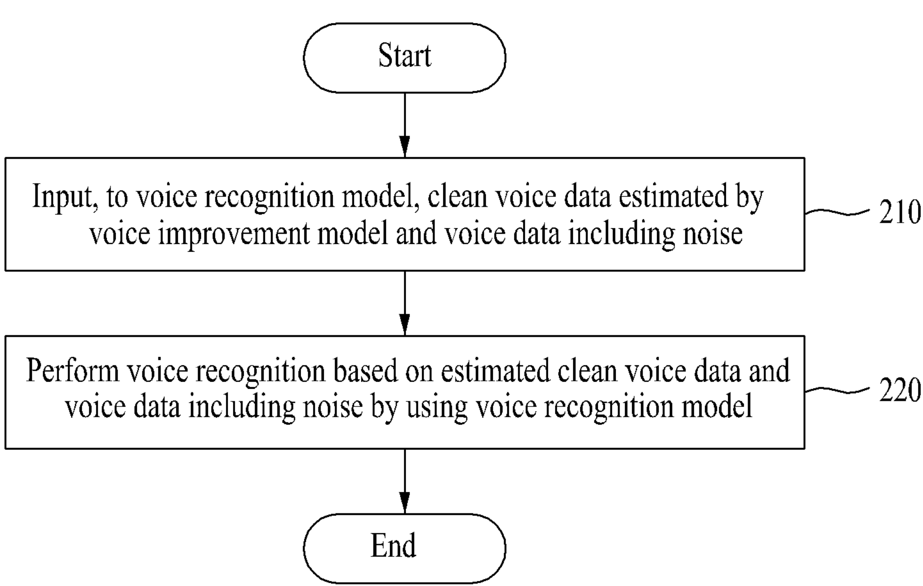
FIG. 2 is a flowchart for describing a voice recognition method in an embodiment.

FIG. 1 is a block diagram for describing a construction of a voice recognition system in an embodiment. FIG. 2 is a flowchart for describing a voice recognition method in an embodiment.

A processor 100 of the voice recognition system may include a data input unit 110 and a voice recognition execution unit 120. Such components of the processor may be expressions of different functions that are performed by the processor in response to a control command that is provided by a program code stored in the voice recognition system. The processor and the components of the processor may control the voice recognition system to perform steps 210 and 220 that are included in the voice recognition method of FIG. 2. In this case, the processor and the components of the processor may be implemented to execute an instruction according to a code of an operating system and a code of at least one program which are included in a memory.

The processor may load, onto the memory, a program code stored in a file of a program for the voice recognition method. For example, when the program is executed by the voice recognition system, the processor may control the voice recognition system to load the program code from the file of the program to the memory under the control of the operating system. In this case, each of the data input unit 110 and the voice recognition execution unit 120 may be a different functional expression of the processor for subsequently executing steps 210 and 220 by executing an instruction of a corresponding part of the program code loaded onto the memory.

In step 210, the data input unit 110 may input, to a voice recognition model, clean voice data estimated by a voice improvement model and voice data including noise. In this case, the voice recognition model may have been trained to perform voice recognition that is robust against noise through a combination of a voice feature of voice data including noise and a voice feature of estimated clean voice data by using the estimated clean voice data as a conditioning feature of the voice recognition model. For a more detailed description of the voice recognition model, reference will be made to FIG. 3.

In step 220, the voice recognition execution unit 120 may perform voice recognition based on the estimated clean voice data and the voice data including the noise by using the voice recognition model. The voice recognition execution unit 120 may output text from the input voice through the voice recognition that is robust against noise.

Figure 3:
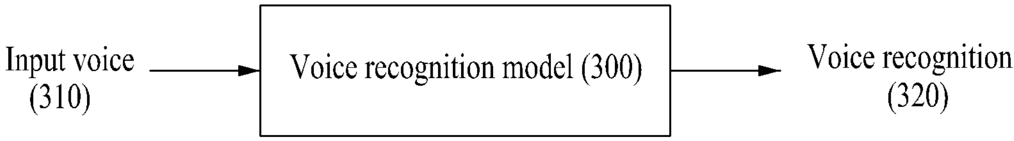
FIG. 3 is a diagram for describing a general operation of voice recognition in an embodiment.

FIG. 3 is a diagram for describing a general operation of voice recognition in an embodiment.

The voice recognition system may perform voice recognition by using a voice recognition model 300. The voice recognition model 300 may be a voice recognition model in which a feature-wise layer modulation (FiLM) layer has been added to the encoder of an end-to-end voice recognition model of a transformer structure including a self-attention layer. The voice recognition model 300 may have been trained so that voice recognition that is robust against noise is performed through a combination of a voice feature of voice data including noise and a voice feature of estimated clean voice data by using, as a conditioning feature, the clean voice data estimated by the voice improvement model. An input voice 310 may be input to the voice recognition model 300 as input data. The results of voice recognition 320 from the input voice 310 may be output as output data through the voice recognition model 300.

The voice recognition model 300 is described with reference to FIG. 4 in order to help understanding of the voice recognition model 300.

First, a voice improvement model 410 is described. The voice recognition system may estimate a clean voice from a voice including noise by using the voice improvement model 410. The voice improvement model 410 may be variously present. In an embodiment, a Conv-TasNet model, that is, one voice improvement model 410, is described as an example. For the Conv-TasNet model, reference is made to contents disclosed in Non-patent document 5 (Y. Luo and N. Mesgarani, "Conv-TasNet: Surpassing ideal time-frequency magnitude masking for speech separation," IEEE/ACM Transactions on Audio, Speech, and Language Processing, vol. 27, no. 8, pp. 1256-1266, 2019).

The Conv-TasNet model may basically include a total of three modules, including an encoder module, a separation module, and a decoder module. In order to train the Cony-TasNet model, first, voice data "x" including noise may be generated. The voice data "x" including noise may be generated by adding noise "n" to a clean voice "s". The generated voice data "x" including noise may be represented like Equation 1.

$$x = s + n \quad \text{[Equation 1]}$$

The generated voice data $x \in \mathbb{R}^{1\times T}$ including noise may be encoded as an N-dimensional expression $w \in \mathbb{R}^{N\times \hat{T}}$ by the encoder module including a trainable convolutional layer. The encoder module may encode the length T of an input signal into the number of frames of $\hat{T}$ by performing a convolution operation having the size of L kernels and a stride size of L/2. An expression "w" generated by the encoder module may be represented like Equation 2.

$$w = \text{encoder}(x) \quad \text{[Equation 2]}$$

The separation module plays a role of estimating a mask $m \in \mathbb{R}^{N\times \hat{T}}$ for removing noise. In this case, the expression "w" encoded by the encoder module may be input as input data of the separation module. The encoded expression "w" may be computed by a plurality of one-dimensional (1-D) convolutional blocks called global layer normalization, 1×1 convolution, and a temporal convolution network (TCN) within the separation module. The separation module has a structure in which the dilation factor of each module is doubled in size in B consecutive 1-D convolutional blocks, and has a form in which the dilation factor is repeated again R times in the B consecutive 1-D convolutional blocks.

One 1-D convolutional block may be constructed in order of 1×1 convolution and PReLU, normalization, depth-wise dilated convolution, PReLU, and normalization. In this case, the depth-wise dilated convolution has a receptive field having a wide range through the consecutive 1-D convolutional blocks by applying a dilation scheme. Each of the consecutive 1-D convolutional blocks has two outputs having a form of a residual path for the input of the consecutive 1-D convolutional block and a form of a skip connection path. The residual path refers to a form in which a feature map of an input is added to an output in order to prevent a gradient vanishing or exploding problem in the consecutive 1-D convolutional block. Furthermore, the skip connection paths of all the 1-D convolutional blocks are used as information for estimating the mask of a clean voice signal. The estimated mask is multiplied by the encoded expression "w" and may be represented like Equation 3.

$$d = w \odot m \quad \text{[Equation 3]}$$

The decoder module plays a role of receiving $d \in \mathbb{R}^{N\times \hat{T}}$ s input data and changing the input data into a voice signal from which noise has been removed. The decoder module may include a transposed convolution layer, and has the same kernel and stride size as the encoder module. A clean signal estimated by the decoder module may be represented like Equation 4.

$$\hat{x} = \text{Decoder}(d) \quad \text{[Equation 4]}$$

The Conv-TasNet model uses an SDR loss as a loss function and follows Equation 5.

$$SDR_{loss} = 10 \log_{10}\left(\frac{\|s\|^2}{\|s - \hat{x}\|^2}\right) \quad \text{[Equation 5]}$$

In Equation 5, s is an original signal, and $\hat{x}$ is a voice signal obtained by removing noise from x including the noise. The Conv-TasNet model may be trained in a way to reduce a difference between the original signal and the signal from which the noise has been removed.

Next, the voice recognition model 300 is described. The voice recognition system may transform the existing voice recognition model in order to implement voice recognition that is robust against noise. The voice recognition means a technology for outputting text from an input voice. The voice recognition system may use an end-to-end voice recognition model as the voice recognition model 300. The end-to-end voice recognition model is a model that directly predicts an output sequence from an input voice. The end-to-end voice recognition model may be basically divided into three structures, and includes connectionist temporal classification (CTC), an attention-based encoder-decoder (AED), and a recurrent neural network transducer (RNN-T).

A CTC/attention structure model is described. CTC is an algorithm that is used to learn unsegmented sequence data that is present only in the sequence of an output class label and whose alignment between an input and an output is unknown.

An AED model may include an encoder, a decoder, and attention. The encoder plays a role of converting an input voice into a hidden representation. The decoder plays a role of receiving representation information and generating an output sequence. The attention plays a role of providing notification that what information of an input voice needs to be attended when the decoder generates a sequence.

The RNN-T model may include an encoder, a prediction network, and a joint network. The encoder plays a role of converting an input voice feature into a hidden representation. The prediction network plays a role of receiving, as an input, output sequence information until a corresponding time step, and converting the input into a hidden representation. The joint network plays a role of receiving an output value of the encoder and the prediction network and generating an output sequence of a corresponding time step.

CTC has an advantage in that explicit alignment for each frame of an input voice does not need to be known, and has a limit having a conditional independence assumption. This is restrictive to performance improvement in a model of CTC itself. Accordingly, the CTC model is chiefly used with the AED model, and thus improves voice recognition performance.

The AED model has a disadvantage in that a monotonic characteristic of the voice recognition model is not modeled because an attention mechanism is very flexible. In other words, in the case of the voice recognition model, unlike in the translation model, the sequence of an input voice and target text need to be sequentially matched, but the input voice and the target text are not well modeled by the attention. In this case, if the AED model is used along with the CTC model and they are used for multi-task learning, such a limit can be overcome and performance of the voice recognition model can be further improved.

Accordingly, the voice recognition system may use a CTC/Attention end-to-end voice recognition structure in which the CTC model and the AED model are combined. For a description of the CTC/Attention end-to-end voice recognition structure, reference is made to contents disclosed in Non-patent document 6 (S. Watanabe, T. Hori, S. Kim, J. R. Hershey, and T. Hayashi, Hybrid CTC/Attention Architecture for End-to-End Speech Recognition, IEEE Journal of Selected Topics in Signal Processing 2017).

A loss function of the voice recognition model for training the voice recognition model follows Equation 6.

$$L_{ASR} = \lambda L_{CTC} + (1-\lambda)L_{att} \quad \text{[Equation 6]}$$

$L_{CTC}$ is a loss of the CTC model, $L_{att}$ indicates a loss of the AED model, and $\lambda$ means a weight assigned to a loss term.

More specifically, the transformer structure using a FiLM layer is described. The voice recognition system uses the transformer structure as the encoder of the voice recognition model. In this case, the encoder may include a convolutional layer, layer normalization, a multi-head self-attention mechanism, a feed-forward layer, and a residual connection.

The multi-head self-attention mechanism, that is, a core of the transformer structure, plays a role of computing the correlation between all the elements of a sequence, and thus shows performance of the state-of-the art in many voice processing fields. The feed-forward layer includes a plurality (e.g., 2) of perceptron layers, and may be applied to each sequence.

The transformer structure proposed in an embodiment is a transformer structure in which the FiLM layer has been added to a stage ahead of the multi-head self-attention layer. Accordingly, the encoder of the voice recognition model receives two data as an input. One of the two inputs is the input of the existing voice recognition model, and the other input thereof is a conditioning input to be combined in the FiLM layer. The conditioning input outputs a scale value and a bias value via a modulator. The output scale value and bias value are combined with an input feature of the voice recognition model by the FiLM layer.

The voice recognition system may first train Conv-TasNet, that is, the existing voice improvement model. Thereafter, the voice recognition system may train the end-to-end voice recognition model of the transformer structure. In other words, the voice recognition system may train a CTC/Attention voice recognition model having a transformer encoder to which the FiLM layer has been added. In this case, a voice including noise is input to the input of the voice recognition model as an input feature. A clean voice estimated by Conv-TasNet is input to the modulator as the conditioning feature. The transformer encoder combines the input feature and the conditioning feature, and may model acoustic information.

Figure 4:
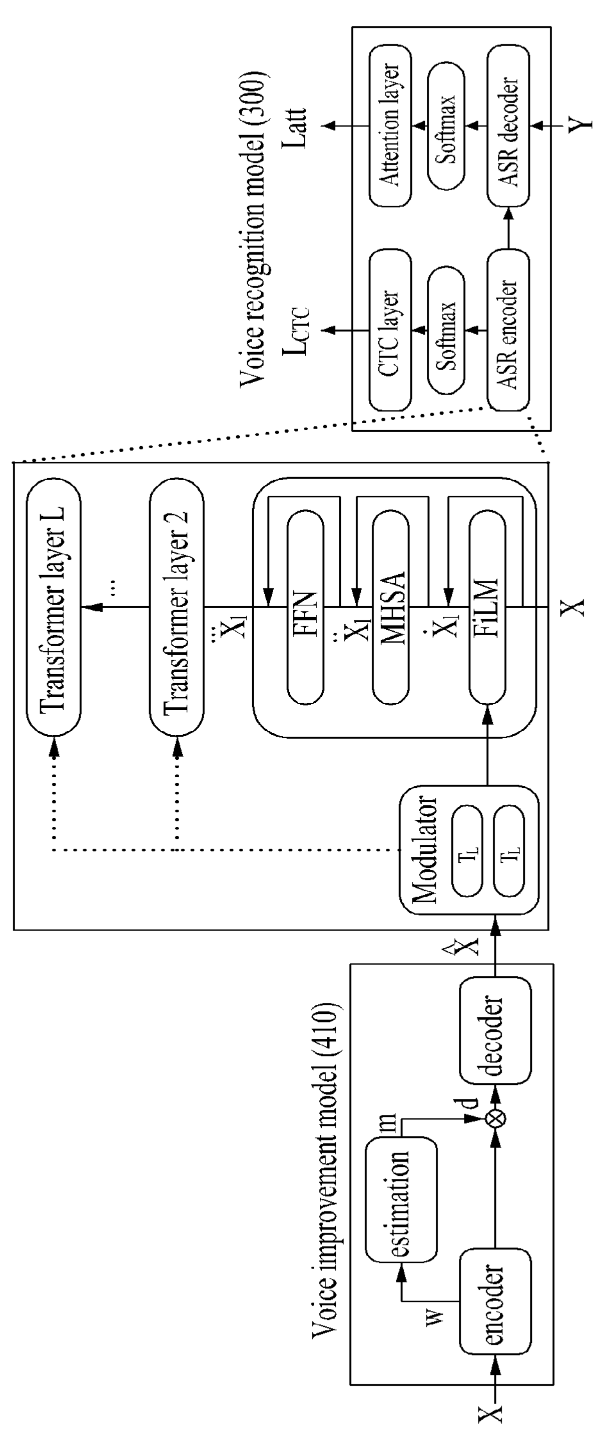
FIG. 4 is a diagram for describing a voice recognition model in an embodiment.

FIG. 4 illustrates a structure of the voice improvement model 410 and the voice recognition model 300. FIG. 4 illustrates, as an example, the Conv-TasNet model as the voice improvement model 410 and the CTC/Attention end-to-end structure as the voice recognition model 300. The encoder (ASR encoder) of the voice recognition model (E2E-ASR) is described. The transformer layer may include a FiLM layer, multi-head self-attention, and a feed-forward module.

The FiLM layer plays a role of combining a clean voice estimated by Conv-TasNet and an input voice of the voice recognition system, and is represented like Equation 7.

$$FiLM(X, \hat{X}) = r_L(\hat{X}) \odot X + h_L(\hat{X}), \quad \text{[Equation 7]}$$

X is a voice including noise signal and input as input data of a voice recognizer. $\hat{X}$ is a clean voice signal estimated from X and input to the modulator. That is, X becomes an input feature, and $\hat{X}$ becomes a conditioning feature. $r_L$ and $h_L$ and are affine transforms of an L-th layer, respectively, and $\odot$ indicates a product for each element. The FiLM layer is positioned at a stage ahead of an MHSA layer in a voice recognition encoder. The encoder enables an acoustic model to be modeled based on a voice feature including noise and a clean voice feature estimated from the voice feature. The mechanism of the FiLM layer is represented like Equation 8.

$$\dot{X} = X + FiLM(X, \hat{X}) \quad \text{[Equation 8]}$$

The computation of the mechanism after the FiLM layer follows Equation 9 and Equation 10.

$$\ddot{X} = \dot{X} + MHSA(\dot{X}) \quad \text{[Equation 9]}$$

$$\dddot{X} = LayerNorm\left(\ddot{X} + FFN\left(\ddot{X}\right)\right) \quad \text{[Equation 10]}$$

MHSA and FFN indicate multi-head self-attention and a feed-forward network, respectively.

According to an embodiment, the results of the measurement of voice recognition performance are described. Tables 1, 2, 3, and 4 are the results of the measurement of voice recognition performance. Test data includes a total of the following three data. "Clean" indicates a clean data corpus not including noise. "Matched" indicates a data corpus including noise, which is generated by using CHiME-4 noise used for the generation of learning data. Furthermore, "unmatched" indicates a data corpus including noise, which is generated by using NOISEX DB noise that is not used for the generation of learning data. Performance was measured as a word error rate (WER), which means better performance when a value obtained by dividing the number of words including an error by a total number of words is reduced.

TABLE 1

| | WER (%) | | |
|---|---|---|---|
| ASR_model | clean | matched | unmatched |
| ASR_Clean | 5.3 | 25.3 | 31.7 |
| ASR_MCT | 6.8 | 11.1 | 13.9 |

First, Table 1 is a baseline. In Table 1, the voice recognition system was trained by clean data not including noise and multi-condition data, which are indicated as "ASR_Clean" and "ASR_MCT", respectively. The multi-condition data includes clean data of 10% not including noise and data of 90% including noise. As may be seen from the results of Table 1, performance of the voice recognition model (ASR_Clean) trained by only the clean data is very vulnerable to a test corpus including noise. If data including noise is used in learning data, the voice recognition model (ASR_Clean) shows results that are more robust against noise than noise (ASR_MCT). However, in this case, performance of the voice recognition model (ASR_Clean) is deteriorated with respect to the existing clean test data. The reason for this is that the clean data of only 10% is included in the learning data. This is a tradeoff in which performance in the clean data is reduced instead of obtaining performance improvement in data including noise.

TABLE 2

| | WER (%) | | |
|---|---|---|---|
| ASR_model | clean | matched | unmatched |
| ASR _Clean | 5,4 | 11.8 | 16.7 |
| ASR _MCT | 6.9 | 11.3 | 12.8 |

Table 2 is the results of the test of voice recognition by using a clean voice estimated by the voice improvement model. It may be seen that most of performance was improved in a noise environment because a voice from which noise had been removed was used. However, it may be seen that ASR_MCT using the "matched" data corpus has poorer performance than that of the existing model. In this case, noise generated by the voice improvement model had a bad influence on the voice recognition model.

TABLE 3

| | WER (%) | | |
|---|---|---|---|
| ASR_model | clean | matched | unmatched |
| ASR_Enh of Noisy | 5.3 | 9.3 | 12.4 |
| ASR_Enh of MCT | 5.6 | 9.6 | 12.8 |

Table 3 used a clean voice estimated by the voice improvement model, and shows the results of the re-training of the voice recognition model by using corresponding data. In this case, it may be seen that performance was further improved in an environment including noise and "clean" data corpus became better compared to a case where performance was deteriorated.

TABLE 4

| | WER (%) | | |
|---|---|---|---|
| ASR_model | clean | matched | unmatched |
| ASR_FiLM of Noisy | 5.7 | 8.5 | 10.0 |
| ASR_FiLM of MCT | 5.6 | 8.6 | 10.0 |

Table 4 shows the results when a clean voice estimated by a method proposed in an embodiment was used as a conditioning feature through the FiLM layer. Table 4 shows better performance that Table 3 in an environment including noise. Distortion is still present in the "clean" data corpus, but Table 4 shows the results that are quite remarkable when the model proposed in an embodiment is a learning method and model in an environment including noise.

TABLE 5

| FiLM layer | X | ✓ |
|---|---|---|
| Parameter | 27.1M | 28.7M |

Table 5 shows a comparison between the numbers of parameters in the existing model and a model to which the FiLM layer was added. It may be seen that voice recognition performance was significantly improved in an environment including noise by even a slight increase in parameters.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A voice recognition method performed by a voice recognition system, comprising:
- providing voice data comprising noise;
- estimating clean voice data from the voice data using a voice improvement model trained to remove the noise from the voice data to estimate and generate the clean voice data;
- providing a voice recognition model trained to perform voice recognition robust against noise based on a voice feature of the voice data comprising the noise and a voice feature of the estimated clean voice data without the noise, the voice recognition model comprising a feature-wise layer modulation (FILM) layer, wherein the FiLM layer is added to an encoder of an end-to-end voice recognition model of a transformer structure comprising a self-attention layer;
- inputting the estimated clean voice data without the noise to a modulator of the voice recognition model;
- generating a scale value and a bias value by the modulator by applying an affine transform to the voice feature of the estimated clean voice data without the noise to adaptively select required information from the estimated clean voice data for reducing an influence from the noise;
- inputting the scale value and the bias value to the FILM layer, and
- inputting the voice data comprising the noise to the FILM layer, the estimated clean voice data without the noise being a conditioning feature of the voice recognition model and the voice data comprising the noise being an input feature of the voice recognition model; and
- performing voice recognition based on the estimated clean voice data and the voice data comprising the noise using the voice recognition model by performing an element-wise product of the scale value and the voice feature of the voice data comprising the noise and adding the bias value thereto in the FILM layer.

2. The voice recognition method of claim 1, wherein the end-to-end voice recognition model of the transformer structure comprises a CTC/Attention structure in which CTC and an AED model have been combined.

3. The voice recognition method of claim 1, wherein in the transformer structure, the FILM layer has been added to a stage ahead of a multi-head self-attention layer.

4. The voice recognition method of claim 1, wherein:
- the voice recognition model comprises a plurality of transformer layers, and
- the plurality of transformer layers comprise the FILM, a multi-head self-attention layer, and a feed-forward module.

5. The voice recognition method of claim 1, wherein the encoder comprises a convolutional layer, layer normalization, a multi-head self-attention layer, a feed-forward layer, and a residual connection.

6. A voice recognition system comprising:
- at least one processor; and
- memory storing instructions that, when executed by the at least one processor, cause the at least one processor to:
  - provide voice data comprising noise;

estimate clean voice data from the voice data using a voice improvement model trained to remove the noise from the voice data to estimate and generate the clean voice data;

input the estimated clean voice data without the noise to a modulator of a voice recognition model;

generate a scale value and a bias value by the modulator by applying an affine transform to a voice feature of the estimated clean voice data without the noise to adaptively select required information from the estimated clean voice data for reducing an influence from the noise;

input the scale value and the bias value to the FILM layer, and input the voice data comprising the noise to the FILM layer, the estimated clean voice data without the noise being a conditioning feature of the voice recognition model and the voice data comprising the noise being an input feature of the voice recognition model; and perform voice recognition based on the estimated clean voice data and the voice data comprising the noise using the voice recognition model by performing an element-wise product of the scale value and the voice feature of the voice data comprising the noise and adding the bias value thereto in the FILM layer.

* * * * *